(12) United States Patent
Glöggler et al.

(10) Patent No.: US 12,529,885 B2
(45) Date of Patent: Jan. 20, 2026

(54) FILTER SWITCHING DEVICE FOR AN ENDOSCOPIC CAMERA HEAD, CAMERA HEAD AND RETROFIT KIT FOR RETROFITTING A CAMERA HEAD AND/OR AN ENDOSCOPE

(71) Applicant: KARL STORZ SE & Co. KG, Tuttlingen (DE)

(72) Inventors: Bernhard Glöggler, Singapore (SG); Uwe Martin, Spaichingen (DE); Thomas Hinding, Aldingen (DE); Deborah Rüger, Feuchtwangen (DE)

(73) Assignee: KARL STORZ SE & Co. KG, Tuttlingen (DE)

( * ) Notice: Subject to any disclaimer, the term of this patent is extended or adjusted under 35 U.S.C. 154(b) by 98 days.

(21) Appl. No.: 18/521,413

(22) Filed: Nov. 28, 2023

(65) Prior Publication Data
US 2024/0176127 A1 May 30, 2024

(30) Foreign Application Priority Data

Nov. 29, 2022 (DE) .......................... 102022131502.9

(51) Int. Cl.
*G02B 23/24* (2006.01)
*G02B 26/00* (2006.01)

(52) U.S. Cl.
CPC ....... *G02B 23/2484* (2013.01); *G02B 23/243* (2013.01); *G02B 26/008* (2013.01)

(58) Field of Classification Search
CPC G02B 23/2484; G02B 23/243; G02B 26/008; G02B 7/006; G02B 23/2453;
(Continued)

(56) References Cited

U.S. PATENT DOCUMENTS 11,774,736 B2 10/2023 Forster
12,310,560 B2 * 5/2025 Kress ................. A61B 1/00105
(Continued)

FOREIGN PATENT DOCUMENTS

DE 10157075 A1 6/2003
DE 10312644 A1 9/2004
(Continued)

OTHER PUBLICATIONS

Obermeierm, German Search Report and Opinion (German language), Aug. 17, 2023, pp. 1-6, DPMA, Munich.
(Continued)

*Primary Examiner* — Timothy R Newlin

(74) *Attorney, Agent, or Firm* — David N. Villalpando; Jacqueline Cohen

(57) ABSTRACT

The invention concerns a filter switching device for an endoscopic camera head with at least three optical filters comprising an outer surface, with an optical path and a rotating element, wherein, by means of the rotating element, each optical filter is movable into and out of the optical path, wherein the filter switching device comprises a groove with a non-circular trajectory, so that the at least three optical filters are moveable by means of the non-circular trajectory of the groove and the rotating element. Furthermore, the invention concerns a camera head and a retrofit kit for retrofitting a camera head and/or an endoscope.

18 Claims, 5 Drawing Sheets

(58) Field of Classification Search
CPC ............ G02B 23/2476; A61B 1/00096; A61B 1/0646; A61B 1/00186
See application file for complete search history.

(56) References Cited

U.S. PATENT DOCUMENTS

| | | | | |
|---|---|---|---|---|
| 2005/0004435 | A1* | 1/2005 | Kehr | A61B 1/00183 600/172 |
| 2008/0004495 | A1* | 1/2008 | Allen | A61B 1/0638 600/160 |
| 2010/0102211 | A1* | 4/2010 | Murooka | A61B 1/00186 250/225 |
| 2012/0241620 | A1* | 9/2012 | On | A61B 5/0084 250/216 |
| 2013/0286355 | A1* | 10/2013 | Lin | G03B 21/14 353/7 |
| 2014/0051924 | A1 | 2/2014 | Wang | |
| 2014/0051925 | A1* | 2/2014 | Kang | A61B 1/00186 600/109 |
| 2017/0285321 | A1* | 10/2017 | Azuma | G03B 11/00 |
| 2017/0293134 | A1* | 10/2017 | Otterstrom | G02B 27/141 |
| 2018/0069995 | A1* | 3/2018 | Lim | G02B 13/0055 |
| 2018/0188475 | A1* | 7/2018 | Chu | G02B 7/02 |
| 2019/0222737 | A1* | 7/2019 | Aoyama | A61B 1/00006 |
| 2019/0281202 | A1* | 9/2019 | Chen | G03B 11/00 |
| 2019/0335978 | A1* | 11/2019 | Chiba | H04N 23/555 |
| 2020/0214547 | A1* | 7/2020 | Aoyama | A61B 1/0646 |
| 2020/0292784 | A1* | 9/2020 | Range | G02B 7/04 |
| 2020/0329180 | A1* | 10/2020 | Fujiwara | G02B 7/02 |
| 2021/0215920 | A1* | 7/2021 | Forster | G02B 21/0044 |
| 2021/0239965 | A1* | 8/2021 | Masaki | G02B 23/2469 |
| 2023/0213725 | A1* | 7/2023 | Song | G02B 7/02 359/819 |
| 2024/0337826 | A1* | 10/2024 | Kakidani | G03B 17/02 |

FOREIGN PATENT DOCUMENTS

| | | |
|---|---|---|
| DE | 102020100676 B3 | 4/2021 |
| EP | 3203296 B1 | 5/2018 |
| GB | 515798 A | 12/1939 |
| JP | 2011141403 A | 7/2011 |

OTHER PUBLICATIONS

Neumann, Wiebke, Extended European Search Report, Feb. 15, 2024, pp. 1-8, European Patent Office, Munich.

* cited by examiner

Fig. 6
A)
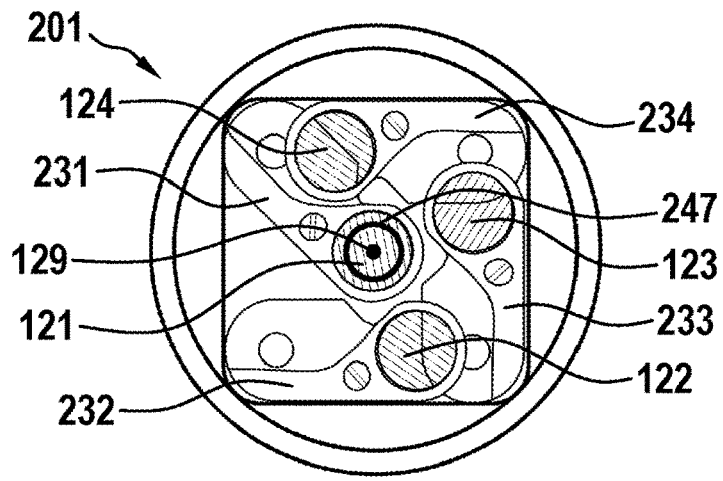
B)
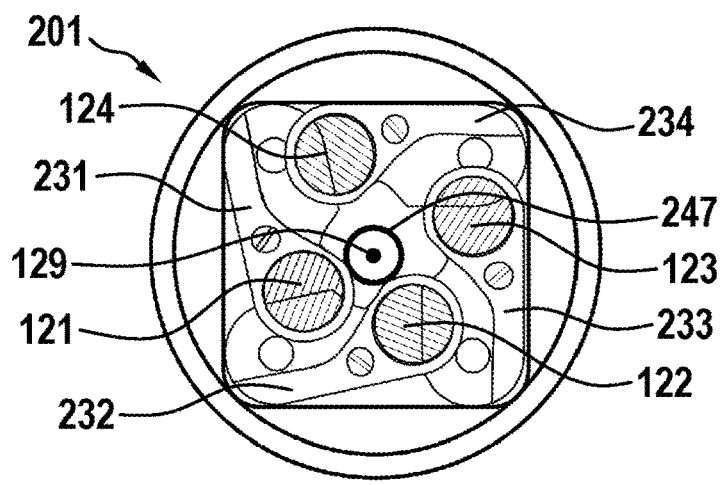
C)
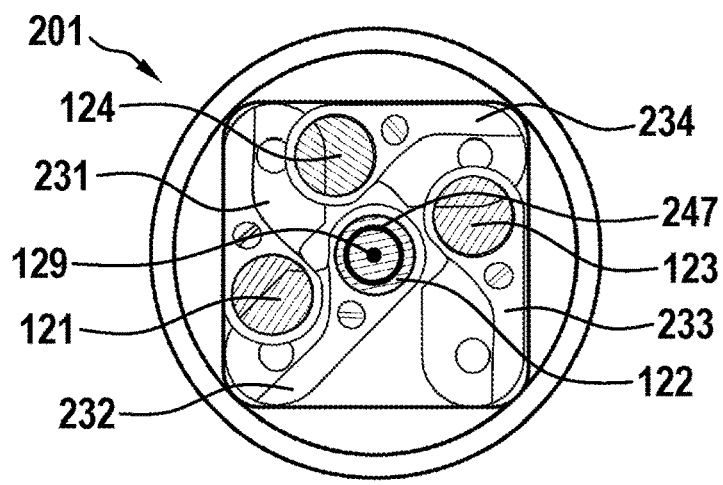

FILTER SWITCHING DEVICE FOR AN ENDOSCOPIC CAMERA HEAD, CAMERA HEAD AND RETROFIT KIT FOR RETROFITTING A CAMERA HEAD AND/OR AN ENDOSCOPE

CROSS REFERENCE TO RELATED APPLICATIONS

This application claims priority to German Patent Application No. 10 2022 131 502.9, filed Nov. 29, 2022, and entitled, "Filter Switching Device for an Endoscopic Camera Head, Camera Head and Retrofit Kit for Retrofitting a Camera Head and/or Endoscope," which is incorporated herein by reference.

BACKGROUND OF THE INVENTION

In medical or industrial applications, observation instruments such as endoscopes are used to observe and examine an internal cavity of a human or animal body or of industrial objects, such as a piping. For imaging, a camera head including an image sensor can be used together with the endoscope. For improving the image quality or for enabling different observation modes, it is known to position different filters into the optical path of the observation instrument. For example, when performing fluorescent imaging, the subject scene is exposed to an excitation radiation, which causes a fluorophore, which has been previously applied to, or already exists in, a tissue or object, to emit light of a particular wavelength different from, and usually longer than, the wavelength of the excitation radiation. As the emission light is generally far dimmer than other sources, including the excitation fluorescence light or imaging white light, it is necessary to filter out unwanted wavelength bands such that, to the best practical extent, only the desired spectrum reaches the image sensor of the camera head when operating in a fluorescence mode. Therefore, a suitable filter has to be introduced into the observation optical path, for which different filter switching devices are known.

EP 1 372 460 B1 discloses a device for positioning at least one optical component inside an endoscopic system comprising a housing through which an optical axis extends and in which at least one component, such as a filter for a specific spectral range, is arranged on a carrier that is pivotable about its pivot axis, and therewith the component can be moved into and back out of the beam path along the optical axis, wherein the smallest incident of an inside wall of the housing from the pivot axis is smaller than the greatest distance of the pivot axis to an outer edge of the at least one component. Due to the closer arrangement of the pivot axis of each carrier to the inside wall of the housing, the number of carriers carrying possibly different filters is limited due to the far-reaching pivoting movement within the limited space of the housing. Furthermore, the housing is rigidly connected with a housing of the optical head of the endoscope.

Likewise, for fluorescence applications, the emission filter is usually arranged in the endoscope head. For example, a rigid endoscope is known, wherein, inside the endoscope head, two optical emission filters are integrated. These emission filters can be manually swiveled in and out of the optical path. It is disadvantageous that, in this endoscopic head, only two optical filters can be used. Further, there is a certain risk that the operator, during use, will neglect to switch the correct emission filter into position, resulting in the desired fluorescence mode not functioning as anticipated, as such operator error is not recognized automatically.

Furthermore, filter switching devices in form of a rotating filter wheel are known in the state of the art. For example, DE 103 12 644 A1 discloses a rotatable filter wheel which comprises a plurality of filter receptacles distributed over its outer circumference, into which different disc-shaped filters can be inserted. By rotating the filter wheel, one of the inserted optical filters can be arranged in the beam path of an examination device. Due to the arrangement of the filters at the outer circumference, the major part of the filter wheel has to be arranged beside the optical path and therewith this filter wheel requires a particularly large, lateral installation space.

US 2014/0051925 A1 describes a filter switching device for a fluorescence endoscopic television camera system with a frame comprising a first filter and a second filter disposed in a vertical direction and permanent magnets as well as a rotating ring rotatably disposed outside the frame likewise comprising permanent magnets, so that, by rotating the ring, one filter of this two-mode filtering arrangement is moved into position along an optical path. Likewise, in this filter switching device, the number of filters is limited to two options, and, due to the vertical arrangement of the filters atop of each other, a large filter installation space is necessary.

DE 10 2020 100 676 B3 discloses a filter changing device for an optical observation instrument with two beam paths for stereoscopic observation comprising three filter wheels which are arranged one behind the other along a common axis and are rotatable about this common axis and relative to one another. Hereby, the second filter wheel arranged in the middle is driven and each respective driver pin engages in a respective slot or notch of the first filter wheel and the third filter wheel, wherein each slot or notch is shaped as a quarter circle. Due to the sequential arrangement of the filter wheels along the optical path and therewith in three planes as well as the necessary drive at the outer circumference of the second filter wheel, this filter changing device is space consuming both in the longitudinal and vertical directions.

DE 101 57 075 A1 discloses a device for positioning at least one optical component, for example a filter for a specific spectral wavelength range, within an endoscopic system with a housing, through which the optical axis of the endoscopic system runs and in which the at least one optical component is arranged. By means of respective one carrier each optical component can swivel into and out of the beam path about each a pivot axis running essentially parallel to a longitudinal axis of the housing. A shorter distance of an inner wall of the housing from the pivot axis is smaller than a largest distance of the pivot axis to an outer edge of the at least one optical component. By arranging the pivot axis of each pivotable carrier closer to the inner wall of the housing, the number of carriers for holding filters that are as different as possible is limited by the spatially far-reaching pivoting movement within the limited space of the housing. In addition, the housing is firmly connected to a housing of the optical head of the endoscope. Another disadvantage is that due to the spatially closer arrangement of the pivot axis on the inner wall of the housing, a large number of movable individual parts are required in order to introduce several filters into the beam path. This results in increased costs and assembly effort. This also increases the risk of wear, inaccuracies in the respective pivoting movement and consequently malfunctions.

BRIEF DESCRIPTION OF THE INVENTION

The present invention concerns a filter switching device for an endoscopic camera head with at least three optical filters comprising an outer surface, with an optical path and a rotating element, wherein, by means of the rotating element, each optical filter is moveable into and out of the optical path. Furthermore, the invention concerns a camera head for an endoscope and a retrofit kit for retrofitting a camera head and/or an endoscope.

The filter switching includes at least three optical filters comprising an outer surface, with an optical path and a rotating element, wherein, by means of the rotating element each filter is moveable into and out of the optical path. The filter switching device comprises a groove with a non-circular trajectory, such that the at least three optical filters are moveable by means of the non-circular trajectory of the groove and the rotating element.

Therewith, a compact, space-saving filter switching device is provided that is arrangeable within an endoscopic camera head or between the proximal end of an endoscope and the distal end of a camera head. It is especially advantageous that the compact filter switching device comprises at least three or even more optical filters and provides a self-actuating movement of the filters within the switching device by means of the non-circular trajectory of the groove and the rotating element. Consequently, the filter switching device is applicable in different fluorescence imaging modes with a large variety of fluorophores as well as in multi-spectral imaging.

In contrast to known filter switching devices, for example, those where a three-dimensional movement of at least two filters is used or where filter wheels always comprise a circular trajectory, the inventive filter switching device uses an explicitly non-circular trajectory for arranging three or more filters in a space-saving, compact design providing their sequential movement into and out of the optical path by rotating the rotating element. Therewith, by means of the groove with a non-circular trajectory and the rotating element, the three or more filters are moved within a single plane. The desired number of filters, as well as their arrangement to each other, can be easily adjusted by the specific form of the groove with the non-circular trajectory for providing the desired observation modes.

BRIEF DESCRIPTION OF THE DRAWINGS

The invention is further explained by the following exemplary description of particular embodiments. The figures show:

FIG. 6 shows schematic views of the filter switcher shown in FIG. 3 with the swivel arms in sequential positions over a period of time.

DETAILED DESCRIPTION OF THE INVENTION

Figure 1:
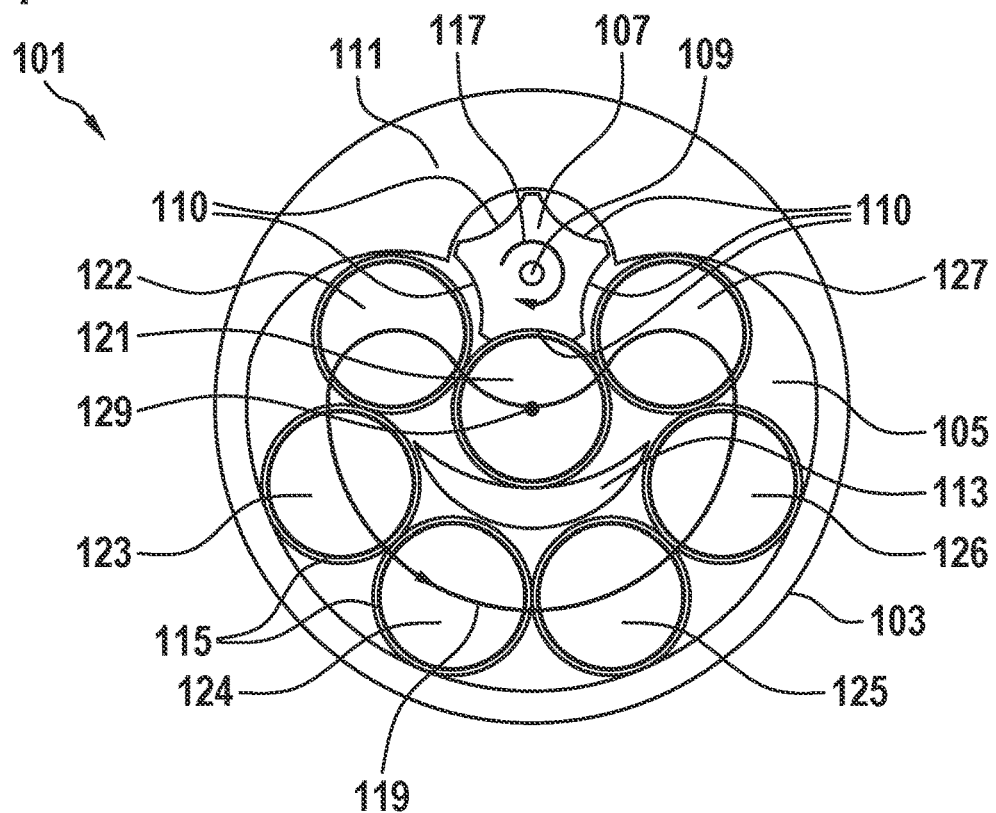
FIG. 1 is a schematic section view of a filter switcher comprising a cogwheel for moving six fluorescence filters and a non-filtering window in a cavity of the filter switcher.

As utilized in accordance with the present disclosure, the following terms, unless otherwise indicated, shall be understood to have the following meanings.

A "filter switching device" is in particular a device that moves one filter, out of three or more filters, into and out of an optical path. The filter switching device is in particular manually or automatically activated by rotating the rotating element such that, in combination with the non-circular trajectory of the groove of the filter switching device, affects the respective movement of one optical filter or two or more optical filters for switching one filter into or out of the optical path. The filter switching device preferably comprises at least three optical filters and/or allows, when selected, one free passage through the optical path. The free passage may be achieved with an unobstructed path or with a non-filtering window. The non-filtering window may simply be an empty region within a frame, or it may be any non-filtering optical element, such as a glass disc. The non-filtering window may also comprise an anti-reflection coating.

An "optical filter" (or simply referred to as "filter") is in particular a device that selects the incident radiation and/or rays to be passed therethrough (or rejected from passing therethrough) based on specific criteria, such as the wavelength, the polarization state and/or the incident angle or direction. The optical filter may also condition the passed illumination, such as converting circularly polarized light into linearly polarized light. In particular, an optical filter can block a specific spectral wavelength band. The optical filter can be a spectral absorption notch filter and/or a band-stop filter. The optical filter can also be an edge filter or an interference filter. The interference filter comprises in particular a coating which affects a blocking or transmission of the respective light. The optical filter is in particular used as an observation and/or detection filter, fluorescence observation filter or excitation filter. A fluorescence observation filter (also called fluorescence filter) is in particular an optical polychroic interference filter for separating emitted fluorescence light from the applied excitation light. Therewith, the fluorescence filter blocks the specific fluorescence excitation radiation and lets the fluorescence emission radiation through along the optical path. Preferably, the fluorescence filter completely blocks the excitation light while it transmits the fluorescence emission light, which usually has a longer wavelength. The optical filter comprises in particular glass and/or a crystalline material. As a matter of principle, instead of an optical filter, also another optical element can be arranged instead in the filter switching device, such as a lens, an aperture, a polarizer or a similar optical element.

An "optical path" is in particular a trajectory that a light ray follows as it propagates through the filter switching device, a camera head, an endoscope and/or an optical medium. Preferably, an aperture is arranged around the optical path in the filter switching device.

A "rotating element" is in particular an element that is rotatable. The rotating element is in particular turnable about its pivot point and/or axis of rotation. The rotating element in particular can be driven by hand and/or by a drive unit or motor. The rotating element is in particular just one single element or component. By rotating the one rotating element and by means of the non-circular trajectory of the groove, at least two filters, preferably three or more filters can be moved two dimensionally and/or within just one plane at the same time. The rotating element can, for example, be a control plate, a rotatable pusher, a cogwheel and/or a gear wheel. By rotating the rotating element, the movement of one optical filter or two or more optical filters is directly or indirectly affected in combination with the non-circular trajectory of the groove. In case of a cogwheel and/or a rotatable pusher, the rotating element in particular ushers the filters along the groove with the non-circular trajectory. In general, the rotating direction of the rotating element can be clockwise and counterclockwise. Therefore, by rotating the rotating element, the filters can be moved forward or backwards along the non-circular trajectory of the groove and/or in and out of the optical path. The rotating element in particular comprises a material with a low coefficient of friction, such as aluminum or a polymer material, such as PTFE. The rotating elements can comprise one contact face or more contact faces and/or moving elements, such as cogs, to act directly or indirectly on an outer surface of a filter and/or an encompassing unit. Furthermore, the rotating element itself can be driven by means of its contact face and/or moving elements, for example by a driving unit and/or a gear.

A "groove" is in particular a slot or incision cut into a member, a rotating element, a base plate and/or a control plate. A groove can also be a cavity, border, casing or some other opening and/or hollow space inside the filter switching device and/or at a sidewall of the filter switching device. The groove can in particular be a guiding groove. By an elongated guiding groove, the filters are guided on a track or moved between a start position and an end position by means of the non-circular trajectory. The groove can be arranged in a plate, such as a rotatable control plate or in a base plate, wherein the groove can be closed at its bottom and therewith the bottom of the plate is intact or the groove cuts through the plate completely. The groove, and therewith the non-circular trajectory, is in particular closed in its longitudinal direction, so that, by means of the non-circular trajectory of the groove, and by rotating the rotating element, the movements of the optical filters are continuously repeated sequentially during the turning of the rotating element clockwise or counterclockwise. The groove, and therewith the non-circular trajectory, is in particular formed as a continuous loop. Consequently, by the combination of the non-circular trajectory and the rotating element, the sequence of the movement of the optical filters into and out of the optical path is affected in a self-propelled manner and activated without the need for each respective optical filter to be moved independently at a certain time.

A "non-circular trajectory" is in particular a path provided by the groove that is not circular. In general, the non-circular trajectory can have any form as long as it is not circular. The non-circular trajectory is in particular a self-contained, closed curve. The non-circular trajectory, and therewith the form of the groove can have different sections and/or one track, two tracks, or several tracks, as well as a return track. Therewith, two or more tracks and/or a return track can also be arranged parallel to allow a filter to be moved back to a starting or initial position. The non-circular trajectory can have the shape of a heart or a heart-like shape without the tip below. A "heart curve" is in particular a plain, fourth-order algebraic curve having a heart-shape or a heart-like shape.

"Fluorescence" is in particular an emission of light by a substance (fluorophore) that has absorbed light or other electromagnetic radiation. In particular, the fluorophore is irradiated with a specific excitation wavelength or wavelength band to emit light with a specific emission wavelength of wavelength band. Normally, the emission wavelength of light is longer than the excitation wavelength or light. For example, indocyanine green (ICG) has an excitation peak around 789 nm and an emission peak around 814 nm. Depending on the fluorophore, the emission radiation can be seen as a distinctive color. In fluorescence imaging biological material, such as living tissue in a body cavity or a bacterium in the environment, is dyed with a fluorophore directly or by administered a substance which is converted into the fluorophore by the body or microorganism prior to an endoscopic observation. An illumination source, which may employ an optical filter to select an excitation wavelength range provides excitation illumination to an observation scene. The excitation illumination may be, for example, delivered by means of an optical fiber from the illumination source to the distal tip of the shaft of the endoscope, where it may illuminate the scene, including the fluorophore contained therein. Subsequently, the emission, in a specific wavelength range of the fluorophore, is emitted by the tissue containing the fluorophore and is transmitted optically by the endoscope to the filter switching device and the camera head with its housed image sensor. A "fluorophore" can be, per the previous example, indocyanine green, which absorbs light as well as emits fluorescence in the near infrared (NIR) range. The excitation wavelength range of indocyanine green is between 600 nm and 900 nm and the emission wavelength range between 750 nm and 950 nm. Other example fluorophores include protoporphyrin IX (PPIX) with an excitation wavelength range around 405 nm and an emission wavelength range of around 620 nm to 700 nm, and fluorescein with a maximum excitation wavelength of 488 nm and an emitted fluorescence in the green spectral range from 500 nm to 600 nm. Additionally, two fluorophores can be used together and therefore dual fluorescence imaging is possible. Further, it should be noted that auto fluorescence of a tissue or an environment can be detected without previous application of a fluorescent dye, as the tissue naturally fluoresces either spontaneously or under excitation illumination.

An "endoscope" is in particular an inspection and/or observation instrument to look into the cavity of a body or an industrial cavity. The endoscope comprises an elongate shaft with a distal optical system to capture image light from within the cavity and optically transmit it to a proximal end. The endoscope may include a handle which is connectable to the proximal end of the endoscope. The proximal end of an endoscope may also include an eye cup, through which optical visualization may occur, and to which the handle or a camera head may be attached. The endoscope can comprise means for digital image acquisition and transmission. An electronic image sensor can be arranged at the proximal (near user) end of the elongate shaft of the endoscope and there with in the handle of the endoscope. Likewise, instead, the at least one image sensor can be arranged in a separate camera head connectable to the proximal end of the endoscope.

A "camera head" is in particular a device for receiving image light along an optical path from an endoscope and for focusing the received image light on at least one image sensor. Besides the at least one image sensor, the camera head can comprise an aperture or window for transmitting the received image light and a lens group for focusing this image light on the at least one image sensor. The camera head can provide recognition of the attached endoscope and enabling of processing algorithms. A connector for connecting the endoscope and the camera head can be arranged at the distal end of the endoscope and/or the proximal end of the camera head. Also, the inventive filter switching device can be used likewise as a connector to connect the endoscope with the camera head via the filter switching device.

In a further embodiment of the filter switching device, an alignment element is arranged in and/or at the groove for ensuring a proper position of one optical filter in the optical path.

An "alignment element" can be any element that ensures that the required optical filter according to the selected observation mode is located within the optical path. Hereby, the alignment element only needs to ensure a proper, but not necessarily exact positioning of one optical filter in the optical path. The alignment element only has to ensure that light passing along the optical path passes through the selected filter within the optical path. Hereby, the filter can have a larger diameter than the aperture passing light, thus there is some margin in the positioning of one requested optical filter within the optical path by the alignment element. For example, the alignment element can be a boundary element in the groove, a ring perimeter or a section of the rotating element and/or a control plate.

To enable a defined location and positioning of the groove, as well as a directed movement of the optical filters, the groove is arranged in a rotatable control plate or in a base plate.

In case where the groove is arranged in a rotatable control plate, the rotatable control plate simultaneously forms the rotating element and can be driven manually or can be motorized. In case where base plate is employed, the base plate itself is not rotatable, but rather provides the seating of the groove. Preferably, the groove is inserted into a surface and/or a side of the base plate.

In another embodiment of the filter switching device, the at least three optical filters each comprise an encompassing unit at their outer surface.

Preferably, the encompassing unit encompasses each optical filter at its outer surface, where the encompassing unit is not closed relative to the optical path, such that when the respective optical filter is moved into the optical path, the encompassing unit will not obstruct the passage of light along the optical path. For example, in case of a disc shaped optical filter, the encompassing unit encompasses completely or surrounds partly the outer circumference of this optical filter, but does not impinge significantly on the flat, beam passing surfaces thereof.

For holding securely and/or preventing damage to the optical filters during movement, the encompassing unit is a frame or a receptacle of a swivel arm each encompassing and/or holding one optical filter.

A "frame" is in particular a hollow body which encompasses the optical filter at its circumference. A frame can be, for example, a short pipe-like body. A frame in particular forms a protective sleeve for the optical filter.

A "swivel arm" is in particular an elongated element and/or an arm that is pivotable about a pivot point. Due to the non-circular trajectory of the groove, the pivot point of each swivel arm can be arranged closer to the circumference of the control plate than to the aperture for passing along the optical path, and therewith three or more swivel arms can be arranged in a space-saving manner within the filter switching device. The receptacle of a swivel arm is an opening wherein the respective optical filter is tightly seated.

In a further embodiment of the filter switching device, each swivel arm is pivotably fixed by a fixing element to a ground plate.

A "ground plate" is in particular a component of the filter switching device on which the swivel arms are pivotally mounted. The ground plate is in particular free of the groove. However, as a space-saving design, the ground plate can comprise a recess or a cavity in which the swivel arms are arranged and movable.

As each swivel arm is rotatable around its individual pivot point fixed to the ground plate and therewith around the axis of rotation, the swivel arms are moveable individually by means of the non-circular trajectory of the groove in the control plate by rotating the control plate.

For operating each swivel arm individually and specifically by the control plate, each swivel arm comprises a guidance element, wherein the guidance element is at least partially arranged in the groove, so that, by rotating the control plate, the guidance element is moved at least partially along the non-circular trajectory, affecting a movement of at least one swivel arm by which the respective optical filter, held by the swivel arm, is swiveled in or out of the optical path.

As each swivel arm interacts, via the guidance element, with the groove inside the control plate, each swivel arm performs an individual swiveling movement during rotation of the control plate due to the non-circular trajectory. Consequently, during rotation of the control plate, all swivel arms carry out different, consecutive movements according to the form of the non-circular trajectory.

The "guidance element" is in particular an element that can be at least partially inserted into the groove and is rigidly or releasably connected to the swivel arm. The guidance element of each swivel arm is preferably arranged closer to the receptacle of the swivel arm than to the pivot point of the swivel arm. However, the exact positioning of the guidance element at each swivel arm depends on the form of the non-circular trajectory of the groove. Due to the subsequent movement of each guidance element of the swivel arms at least partially along the non-circular trajectory of the groove, the respective swivel arm is moved between a start position, at the maximal distance from the aperture of the optical path, and an end position, in which the respective optical filter is located in the optical path. Hereby, preferably, the aperture for the optical path is arranged in the middle of the control plate. The guidance element, for example, can be a pin or a bolt.

The arrangement of the guidance element "at least partially in the groove" means that the length of the guidance element arranged in the groove does not have to extend through the entire groove depth and therefore the opening of the groove substantially orthogonal to the disc-surface of the control plate.

In another embodiment of the filter switching device, the guidance element can be connected to the swivel arm by a connecting element or a ball bearing.

Therefore, by the connecting element, the guidance element can be connected to the swivel arm releasably. A connecting element can be, for example, a screw. Additionally, the guidance element and the connecting element may be a single element, for example, a threaded post. In general, a connecting element can be any element that allows a releasable connection between the guidance element and the respective swivel arm. Therefore, the connecting element can be an element that provides a form-fitting connection and/or a force-fit connection, such as a tongue and groove connection or a clamping connection. Instead of a rigid connection between each swivel arm and the respective guidance element, the guidance element can also be supported on the swivel arm by a ball bearing, whereby the mechanical wear caused by moving the guidance element within the groove is reduced.

For electrically controlled and/or full automatically driving of the movement of the optical filters, the filter switching device can comprise a motor for driving the rotating element and/or the control plate.

The electrical and/or full automatically driving of the rotating element and/or the control plate can be applied instead of, or additionally to, a manual driving.

A "motor" is in particular a machine preferably converting electrical energy into mechanical energy. A motor can be, for example, an AC motor and/or an electric stepper motor with a gear. The motor in particular acts directly or indirectly on the rotating element and/or the control plate for affecting the rotation of the rotating element and/or the control plate.

In another embodiment of the filter switching device, the rotating element comprises at least one contact surface, so that, when rotating the rotating element, the at least one contact surface of the rotating element contacts at least the encompassing unit of one optical filter and/or two or more optical filters and moves each optical filter further along the non-circular trajectory in the groove.

Therefore, by rotating the rotating element, the contact surface of the rotating element presses against at least one encompassing unit of one optical filter and, by this, ushers this optical filter and the encompassing units of the following optical filters in the rotation direction further along the non-circular trajectory of the groove. Consequently, by rotating the rotating element, each optical filter in its respective encompassing unit is moved subsequently to following positions along the non-circular trajectory in the groove. Therewith, the positions of the optical filters are shifted further along the rotational direction, and further, the optical filters move along the predefined non-circular trajectory of the groove until the selected optical filter is located in the optical path. Preferably, this position with an aperture of the optical path is arranged between the rotating element and the alignment element. Therewith, by rotating just one rotating element three or more filters can be moved simultaneously along the non-circular trajectory of the groove in one plane.

For blocking a certain wavelength band, at least one optical filter can be a spectral absorption notch filter.

Therefore, the kind of spectral absorption notch filter can be selected in dependence on the application and/or the desired observation mode. For example, the spectral absorption notch filter can be a PDD observation filter which blocks light with a wavelength of <430 nm.

In a further embodiment, the filter switching device can comprise an empty encompassing unit or an intermediate swiveled position for passing light therethrough, along the optical path without optical filtering.

Therewith, a compact minimal filter switching device is provided for at least three applications with three different optical filters, as well as an empty position for white light. Overall, four positions are provided by this minimal filter switching device, with three optical filters. However, as already described, the filter switching device can comprise more than three optical filters. In case of pushing the encompassing units with each an optical filter inside the groove, the number of encompassing units and therewith optical filters is only restricted by the diameter of the encompassing unit and the length of the groove. Theoretically, as many encompassing units and therewith optical filters can be arranged in series in direct contact to each other along the non-circular trajectory in the groove as long as the encompassing units are moveable within the groove, and the diameter of the filter apertures is adequate to pass a desired amount of light along the optical path therethrough.

In case of the filter switching device with swivel arm, for example, three swivel arms can each hold an optical filter and, for white light, a swivel arm with an empty receptacle without an optical filter is used. Alternatively, all four swivel arms (or more swivel arms) each hold an optical filter, and consequently four or more intermediate positions where there is no filter along the optical path, can be used for transmitting unfiltered light. These intermediate positions without a receptacle of a swivel arm along the optical path are reached when one swivel arm with the filter is moved back from the aperture of the optical path, in an intermediate state between the optical path and its starting position, and another swivel arm simultaneously has not yet swiveled into the optical path.

For reducing stray light and reflections, the filter switching device can comprise black anodized material and/or plastic material.

Likewise, the filter frames and swivel arms preferably comprise black anodized material and/or a plastic material.

In another aspect of the invention, the problem is solved by a camera head for an endoscope, wherein the camera head comprises an image sensor, an aperture or window for receiving image light along an optical path, and a lens group for focusing the image light on the image sensor, wherein the camera head comprises at least one filter switching device as described above.

Therewith, a camera head is provided, in which a compact, space-saving filter switching device is arranged. By installation of at least one filter switching device directly in the camera head, the camera head can be releasably connected with different kinds of endoscopes.

In a further embodiment of the camera head, the camera head comprises two or more filter switching devices in series to a common optical path.

By stacking two or more filter switching devices in series either inside the camera head or alternatively between the proximal end of an endoscope and the distal end of the camera head, more possible filtering configurations and applications are enabled, particularly in multispectral imaging as well as with a large variety of fluorophores in fluorescent imaging.

For detecting the currently applied filter configuration and for adjusting it if a different observation mode is desired, the camera head comprises a detection unit for detecting an identification of a respective optical filter in the optical path.

Hereby, image processing and/or a physical identification can be used to detect the respective filter within the optical path. For verifying that the correct optical filter is in the proper position, some typical camera parameters can be employed, such as performing a white balance by sun light, analysis of exposure and/or red-green-blue ratio. By means of the received signals the nature of the optical filter inserted in the optical path, may be determined. Another example, involves, in case of a notch or blocking-band filter, observation of the lack of a certain wavelength band in the received signal by which it is possible to identify the optical filter inserted into the optical path.

For adjusting the rotational speed and/or further moving a desired optical filter into the optical path, the camera head can comprise a control unit for adjusting a respective optical filter to be along the optical path when an associated optical mode is selected.

In another aspect of the invention, the problem is solved by a retrofit kit for retrofitting a camera head and/or an endoscope, wherein the retrofit kit comprises at least one filter switching device, so that the filter switching device is arrangeable between a proximal end of the endoscope and a distal end of the camera head.

Therewith, a retrofit kit (sometimes referred to as an "adapter") is provided with at least one filter switching device which can serve simultaneously as a connector between an already existing endoscope and an existing camera head as well as enabling different observation modes. Additionally, the retrofit kit can also include two or more filter switching devices which can be arranged in series between the endoscope and the camera head or one filter switching device can be replaced by another filter switching device for enabling different applications and observation filtering options.

Figure 2:
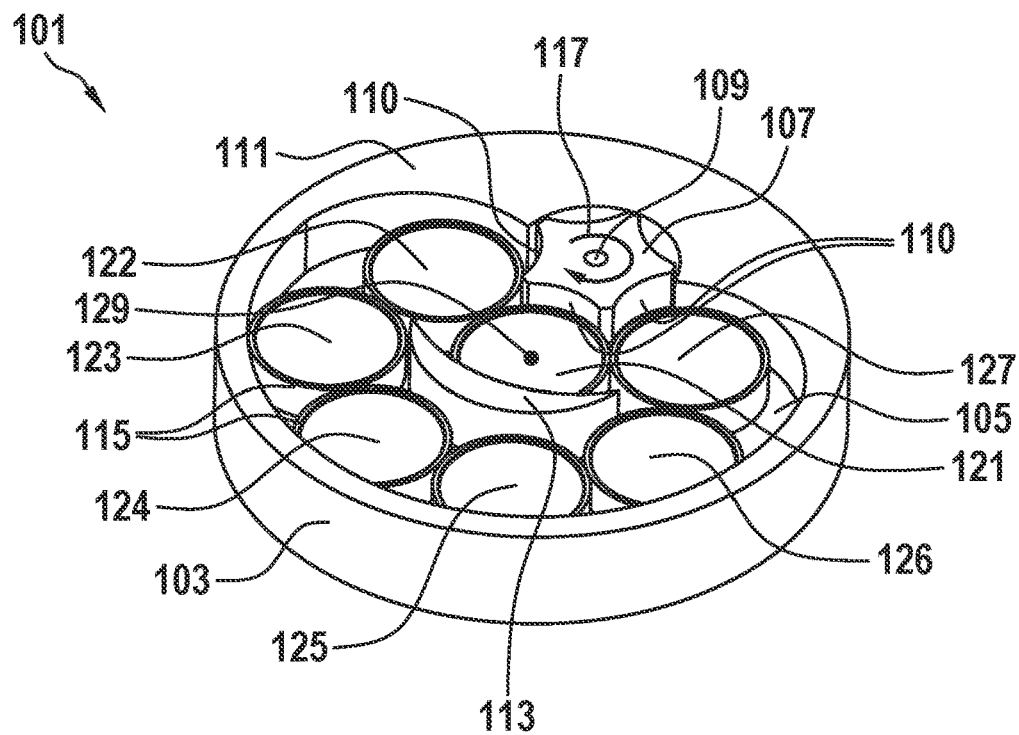
FIG. 2 is a schematic perspective view of the filter switcher shown in FIG. 1.

As shown in FIG. 1, a filter switcher 101 comprises a filter switcher housing 103. In the filter switcher housing 103, a base plate 111 is arranged and a cavity 105 is located inside the base plate 111. Within the cavity 105, an alignment element 113 is located, such that, by the form of the cavity 105 and of the alignment element 113, a non-circular trajectory is provided along the cavity 105. The non-circular trajectory has a heart-like shape without the lower tip of a heart-shape, and therewith defines a movement direction 119 along this trajectory. In the cavity 105, a first fluorescence filter 121, a second fluorescence filter 122, a third fluorescence filter 123, a fourth fluorescence filter 124, a fifth fluorescence filter 125, a sixth fluorescence filter 126 and a non-filtering window 127 are located in series along the non-circular trajectory. Hereby, the respective fluorescence filters 121, 122, 123, 124, 125 and 126 and the non-filtering window 127 are each encompassed by a frame 115, wherein directly adjacent frames 115 of the respective filters 121, 122, 123, 124, 125, 126 and the non-filtering window 127 are in direct contact with each other (FIGS. 1 and 2).

Furthermore, the filter switcher 101 comprises a cogwheel 107 with five contact surfaces 110, wherein three contact surfaces 110 are simultaneously reaching into the cavity 105 when one filter is located along the optical axis. The cogwheel 107 is rotatable around its pivot point 109 clockwise in a rotating direction 117 as well as counterclockwise. An optical path 129 is arranged in the middle of the base plate 111 between the alignment element 113 and the cogwheel 107. In FIG. 1, the first fluorescence filter 121 is arranged in an aperture position of the optical path 129.

For operating the filter switcher 101, the cogwheel 107 is turned manually in the rotating direction 117. Due to the form of the cogwheel 107 and its contact surfaces 110, by turning the cogwheel 107, the respective contact surface 110 presses against the outer surface of the frame 115 of the second fluorescence filter 122 as well as the respective contact surface 110 on the outer surface of the first fluorescence filter 121 and the respective contact surface 110 on the outer surface of the non-filtering window 127, whereby the non-filtering window 127, the first fluorescence filter 121 and the second fluorescence filter 122 are moved further in the movement direction 119 along the non-circular trajectory. Simultaneously, the respective following other fluorescence filters 123, 124, 125 and 126 are likewise moved further in the movement direction 119 along this trajectory due to the direct contact of adjacent frames 115 and the form of the cavity 105. Hereby, the user of the filter switcher 101 rotates the cogwheel 107 until the desired fluorescence filter 122, 123, 124, 125, 126 or the non-filtering window 127 is moved into the optical path 129 to achieve the desired observation mode.

Figure 3:
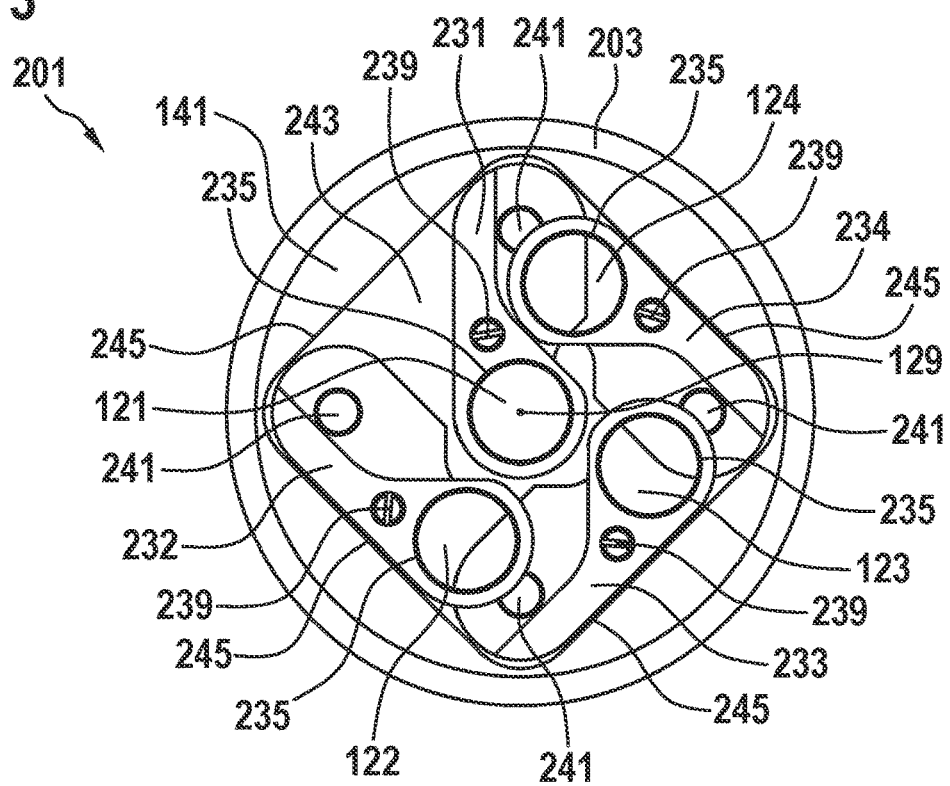
FIG. 3 is a schematic section view of an alternative filter switcher with four swivel arms on a ground plate.
Figure 4:
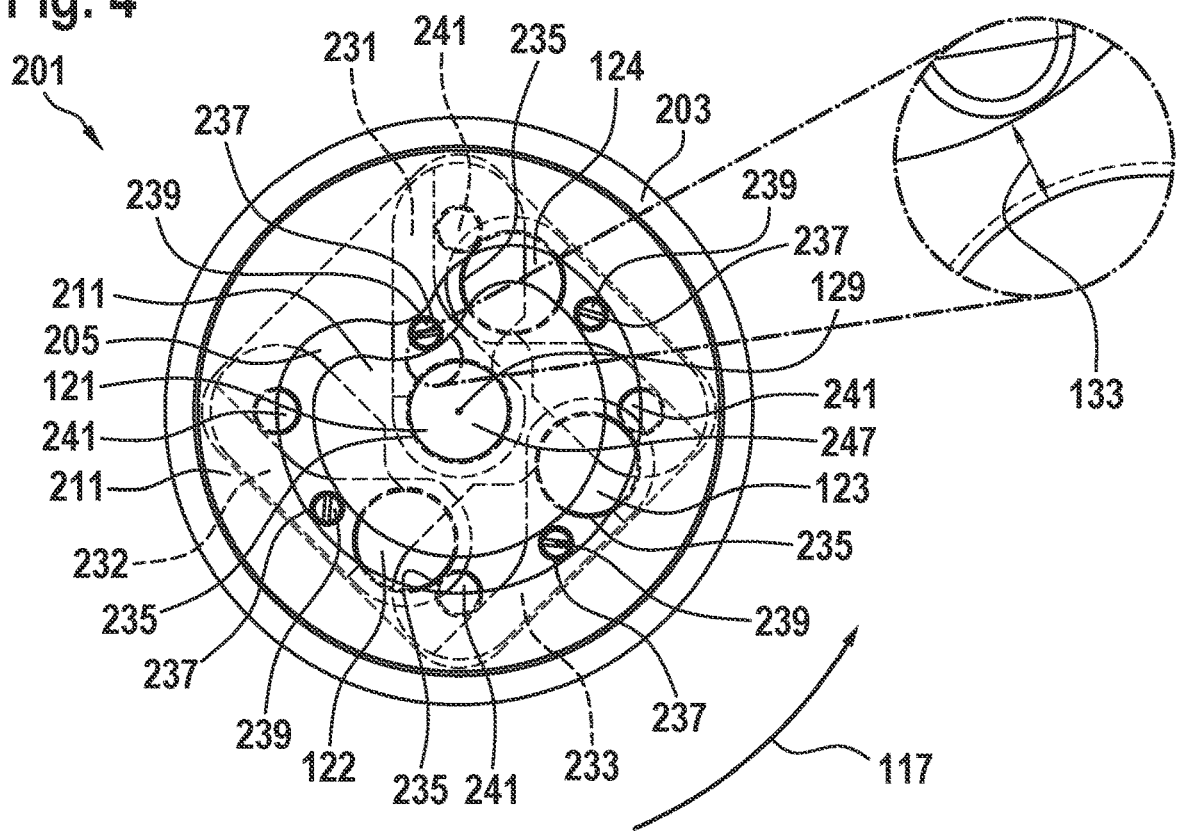
FIG. 4 is another schematic section view of the filter switcher shown in FIG. 3 showing additionally a groove within a control plate.
Figure 5:
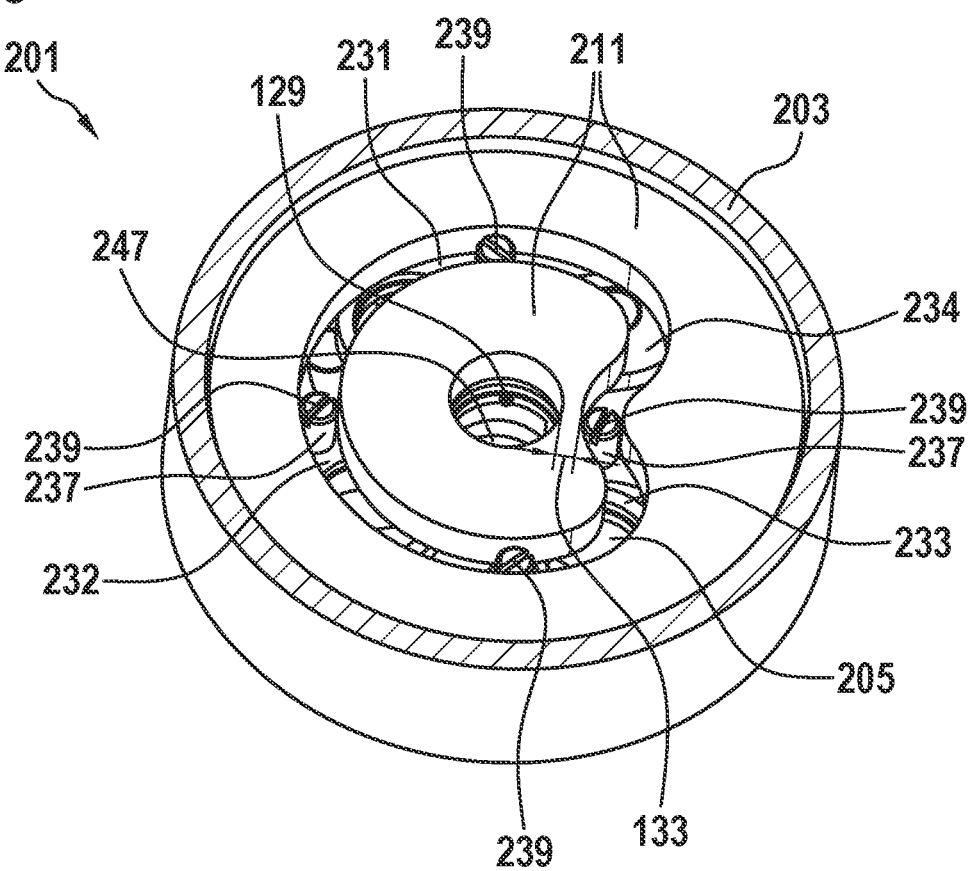
FIG. 5 is a schematic perspective view of the filter switcher shown in FIGS. 3 and 4.

In an alternative, a filter switcher 201 comprises a filter switcher housing 203, wherein, in the filter switcher housing 203, a ground plate 141 is arranged. On the ground plate 141, a first swivel arm 231, a second swivel arm 232, a third swivel arm 233 and a fourth swivel arm 234 are arranged in an essentially rectangular recess 243 surrounded by four side walls 245. Each swivel arm 231, 232, 233 and 234 comprises a rotational axis 241 (FIG. 3). On the opposite side of each rotational axis 241, each swivel arm 231, 232, 233 and 234 comprises a receptacle 235. In the middle of the ground plate 141 and of the recess 243, an aperture 247 for an optical path 129 is located (FIGS. 4 and 5). In the state shown in FIG. 3, the first swivel arm 231 comprises in its receptacle 235 a first fluorescence filter 121 swiveled into the optical path 129. The second swivel arm 232 comprises in its receptacle 235 a second fluorescence filter 122 and is located in a starting position adjacent to the respective sidewall 245 of the recess 243. Likewise, the third swivel arm 233 comprises in its receptacle 235 a third fluorescence filter 123 and the fourth swivel arm 234 holds in its receptacle 235 a fourth fluorescence filter 234, wherein the third swivel arm 233 and the fourth swivel arm 234 are likewise in a starting position arranged at the respective sidewall 245 of the recess 243.

Furthermore, each swivel arm 231, 232, 233 and 234 comprises each a pin 237 which is connected to the swivel arm each by a screw 239. Each pin 237 of the swivel arms 231, 232, 233, 234 is inserted in a groove 205 of a control plate 211 of the filter switcher 201. The groove 205 has a non-circular trajectory in a heart-like shape (see FIGS. 4 and 5). Hereby, the appropriate position of the first fluorescence filter 121 of the first swivel arm 231 at the aperture 247 of the optical path 129 is aligned by a minimal distance section 133 of an inner part of the control plate 211 between the groove 205 and the circumference of the aperture 247 (see detail in FIG. 4).

For operating the filter switcher 201, the control plate 211 is moved counterclockwise in a rotation direction 117, by which the first swivel arm 231 is moved by the rotation of the control plate 211 and therewith by the affected movement of the respective pin 237 from nearest the aperture 247 to its starting position arranged nearest the sidewall 245 of the recess 243. Correspondingly, due to the rotation of the control plate 211 with the groove 205 and therewith the minimal distance section 133 in the counter-clockwise rotation direction 117, simultaneously the second fluorescence filter 122 within the second swivel arm 232 is swiveled into the path of the aperture 247 around the optical path 129, wherein the minimal distance section 133 is then arranged between the groove 205 and the swiveled-in outer circumference of the second fluorescence filter 122 as well as the aperture 247. Due to the heart-like shape of the groove 205, the third swivel arm 233 and the fourth swivel arm 234 remain in the starting positions.

In order to allow a white light mode (or unfiltered light mode), the user further turns the control plate 211 in the counterclockwise rotation direction 117 only partially, such that an unobstructed passage along the optical path 129 is achieved. As illustratively shown in FIG. 6, at a first time A, the first swivel arm 231 is positioned such that first fluorescence filter 121 is positioned along the optical path 129 and within the path of the aperture 247. Subsequently, at time B, after the control plate is partially turned, the first swivel arm 231 is swiveled away from the aperture 247 towards the outside, while simultaneously the second swivel arm 232 is swiveled only partly in the direction of the aperture 247 in the optical path 129, so that, for unfiltered light observation, in this defined intermediate position, the aperture 247 is without any filter. Upon further rotation of the control plate, at time C, the first swivel arm 231 is now fully returned to its starting position, and the second swivel arm 232 is positioned such that the second fluorescence filter 122 is positioned along the optical path 129 and within the path of the aperture 247.

Figure 7:
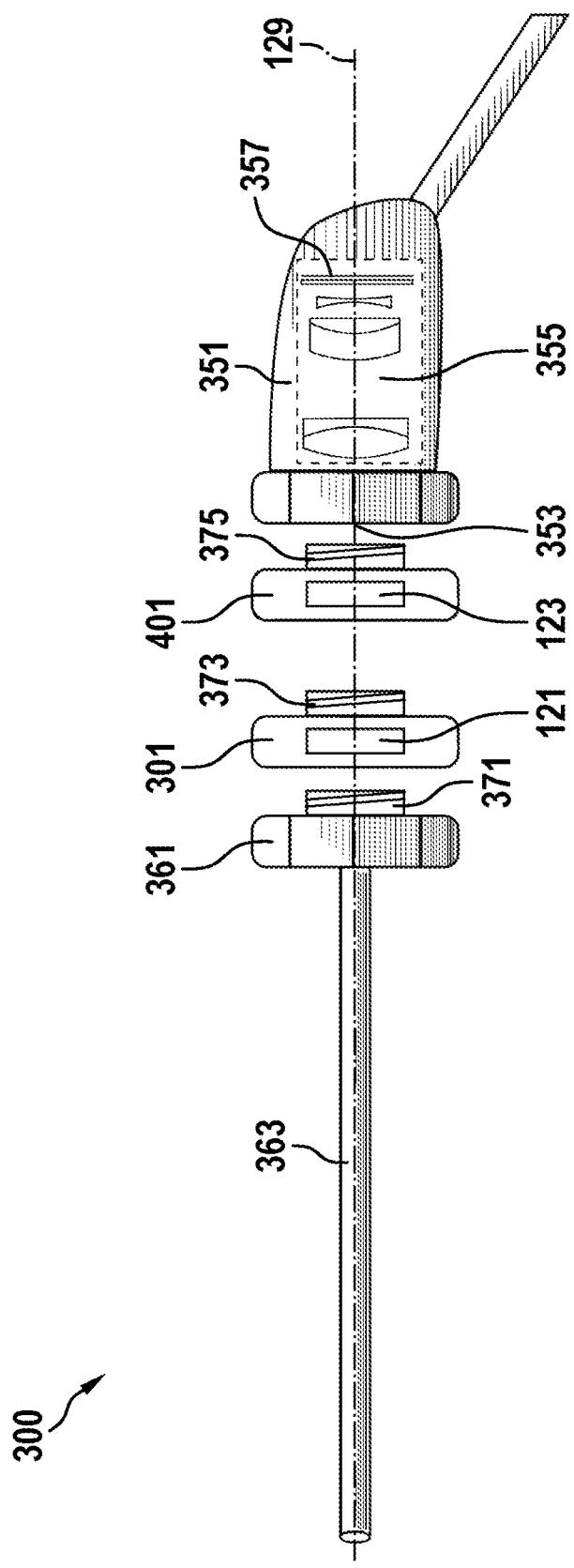
FIG. 7 is a schematic section view on an endoscopic system comprising an endoscope, two filter switchers and a camera head.

In principle, the alternative filter switching devices 101, 201 are arrangeable in a proximal head of an endoscope, in a camera head and/or in between the proximal end of an endoscope and a distal end of a camera head. FIG. 7 shows an example of an endoscopic system 300 with an endoscope 361 comprising a shaft 363 and a camera head 351 with a window 353 for receiving image light, a lens group 355 for focusing the image light on an image sensor 357. The endoscope 361 comprises at its proximal end a first connector 371 that is releasably connectable to a first filter switcher 301. The first filter switcher 301 comprises at its proximal end a second connector 373, which is, again releasably connectable to a second filter switcher 401, wherein the second filter switcher 401 comprises at its proximal end a third connector 375 which is releasably connectable to the camera head 351. Therewith, both, the first filter switcher 301 and the second filter switcher 401 are arranged in series between the endoscope 361 and the camera head 351 along the optical axis 129. The first filter switcher 301 and the second filter switcher 401 are designed as described above for the filter switchers 101, 201 (for clarity of display, in FIG. 7, only the first fluorescence filter 121 is shown in the optical path 129 inside the first filter switcher 301 and a third fluorescence filter 123 is shown in the second filter switcher 401). By mounting the first and second filter switchers 301, 401 between the endoscope 361 and the camera head 351, a more versatile fluorescence imaging system is provided.

Therewith, different filter switchers 101, 201, 301, 401 are provided in a compact space-saving design, which can be arranged flexibly within an endoscope head, a camera head and/or between the endoscope and the camera head.

REFERENCE NUMERALS 101 filter switcher
103 filter switcher housing
105 cavity
107 cogwheel
109 pivot point
110 contact surface
111 base plate
113 alignment element
115 frame
117 rotating direction
119 movement direction along trajectory
121 first fluorescence filter
122 second fluorescence filter
123 third fluorescence filter
124 fourth fluorescence filter
125 fifth fluorescence filter
126 sixth fluorescence filter
127 non-filtering window
129 optical path
133 minimal distance section
141 ground plate
201 filter switcher
203 filter switcher housing
205 groove
211 control plate
231 first swivel arm
232 second swivel arm
233 third swivel arm
234 fourth swivel arm
235 receptacle
237 pin
239 screw
241 rotational axis
243 recess
245 side wall
247 aperture
300 endoscopic system
301 first filter switcher
351 camera head
353 window
355 lens group
357 image sensor
361 endoscope
363 shaft
371 first connector
373 second connector
375 third connector
401 second filter switcher

The invention claimed is:

1. A filter switching device for an endoscopic camera head with at least three optical filters comprising an outer surface, with an optical path and a rotating element, wherein, by means of the rotating element, each optical filter is movable into and out of the optical path, wherein the filter switching device comprises a groove with a non-circular trajectory, configured such that the at least three optical filters are moveable by means of the non-circular trajectory of the groove and the rotating element, wherein the at least three optical filters each comprise an encompassing unit at the outer surface, each encompassing unit being a receptacle of a swivel arm encompassing and/or holding one optical filter.

2. The filter switching device of claim 1, wherein an alignment element is arranged in and/or at the groove for ensuring a proper position of one optical filter in the optical path.

3. The filter switching device of claim 1, wherein the groove is arranged in a rotatable control plate or in a base plate.

4. The filter switching device of claim 1, wherein each swivel arm is pivotably fixed to a ground plate by a fixing element.

5. The filter switching device of claim 1, wherein each swivel arm comprises a guidance element, wherein the guidance element is at least partially arranged in the groove, such that, by rotating the control plate the guidance element is moved at least partially along the non-circular trajectory affecting a movement of at least one swivel arm by which the respective optical filter held by the swivel arm is swiveled in or out of the optical path.

6. The filter switching device of claim 4, wherein each swivel arm comprises a guidance element, wherein the guidance element is at least partially arranged in the groove, such that, by rotating the control plate the guidance element is moved at least partially along the non-circular trajectory affecting a movement of at least one swivel arm by which the respective optical filter held by the swivel arm is swiveled in or out of the optical path.

7. The filter switching device of claim 5, wherein the guidance element is connected to the swivel arm by a connecting element or a ball bearing.

8. The filter switching device of claim 6, wherein the guidance element is connected to the swivel arm by a connecting element or a ball bearing.

9. The filter switching device of claim 3, wherein the filter switching device comprises a motor for driving the rotating element and/or the control plate.

10. The filter switching device of claim 1, wherein the rotating element comprises at least one contact surface, configured such that the at least one contact surface of the rotating element contacts at least the encompassing unit of one optical filter and/or two or more optical filters and moves each optical filter further along the non-circular trajectory in the groove.

11. A camera head for an endoscope, wherein the camera head comprises an image sensor, an aperture or window for receiving image light along an optical path and a lens group for focusing the image light on the image sensor, wherein the camera head comprises at least one filter switching device, the filter switching device comprising at least three optical filters each comprising an outer surface, with a rotating element, wherein, by means of the rotating element, each optical filter is movable into and out of the optical path, wherein the filter switching device comprises a groove with a non-circular trajectory, configured such that the at least three optical filters are moveable by means of the non-circular trajectory of the groove and the rotating element, and wherein the at least three optical filters each comprise an encompassing unit at the outer surface, each encompassing unit being a receptacle of a swivel arm encompassing and/or holding one optical filter.

12. The camera head of claim 11, wherein the camera head comprises two or more filter switching devices in series to a common optical path.

13. The camera head of claim 11, wherein the camera head comprises a detection unit for detecting an identification of a respective optical filter in the optical path.

14. The camera head of claim 12, wherein the camera head comprises a detection unit for detecting an identification of all respective optical filters in the optical path.

15. The camera head of claim 11, wherein the camera head comprises a control unit for adjusting a respective optical filter to be along the optical path when an associated optical mode is selected.

16. The camera head of claim 14, wherein the camera head comprises a control unit for adjusting respective optical filters to be along the optical path when an associated optical mode is selected.

17. A retrofit kit detachably connectable to a camera head and/or an endoscope, wherein the retrofit kit comprises at least one filter switching device, the filter switching device comprising at least three optical filters each comprising an outer surface, with a rotating element, wherein, by means of the rotating element, each optical filter is movable into and out of an optical path between the camera head and the endoscope, wherein the filter switching device comprises a groove with a non-circular trajectory, configured such that the at least three optical filters are moveable by means of the non-circular trajectory of the groove and the rotating element, wherein the at least three optical filters each comprise an encompassing unit at the outer surface, each encompassing unit being a receptacle of a swivel arm encompassing and/or holding one optical filter, and wherein the filter switching device is arrangeable between a proximal end of the endoscope and a distal end of the camera head.

18. The retrofit kit of claim 17, further comprising an alignment element is arranged in and/or at the groove for ensuring a proper position of one optical filter in the optical path.

* * * * *